(12) United States Patent
Van Bilderbeek et al.

(10) Patent No.: US 6,779,602 B1
(45) Date of Patent: Aug. 24, 2004

(54) SEAL

(75) Inventors: Bernard Herman Van Bilderbeek, London (GB); Craig Francis Bryce Hendrie, Wimbledon (GB)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/720,772

(22) PCT Filed: Jun. 17, 1999

(86) PCT No.: PCT/GB99/01937

§ 371 (c)(1),
(2), (4) Date: Feb. 12, 2001

(87) PCT Pub. No.: WO00/00762

PCT Pub. Date: Jan. 6, 2000

(30) Foreign Application Priority Data

Jun. 30, 1998 (GB) .............................. 9814077

(51) Int. Cl.[7] .............................................. E21B 23/00
(52) U.S. Cl. ..................................... 166/216; 277/340
(58) Field of Search ................................ 166/302, 387, 166/381, 196, 216, 134; 277/336, 340

(56) References Cited

U.S. PATENT DOCUMENTS

| | | | | |
|---|---|---|---|---|
| 4,899,543 A | * | 2/1990 | Romanelli et al. | 60/527 |
| 5,199,497 A | * | 4/1993 | Ross | 166/381 |
| 5,215,145 A | * | 6/1993 | Ross | 166/217 |
| 5,346,014 A | * | 9/1994 | Ross | 166/297 |
| 6,009,669 A | * | 1/2000 | Jardine et al. | 49/316 |

* cited by examiner

*Primary Examiner*—William Neuder

(57) ABSTRACT

A sealing device is provided for making a seal against an annular surface. The device includes at least one flexible seal ring having a relaxed position in which the seal ring is out of contact with the surface and an active position in which the seal ring is in sealing contact with the surface, an operating member movable relative to the seal ring in a direction substantially parallel to the annular surface to produce a substantially radial movement of the ring into the active position, and a plurality of elongate, substantially parallel shape-memory material actuators arranged around the annular surface. A change of shape of the actuators produces the movement of the operating member which moves the seal ring into the active position.

16 Claims, 14 Drawing Sheets

SEAL

FIELD OF THE INVENTION

This invention relates to a sealing device for sealing against a cylindrical surface. In a particularly preferred form, the device seals against two cylindrical surfaces which define between them an annular space. The space may be a space between two pipes of different diameter, one arranged inside the other. A typical situation where such a seal is required is in a subterranean well bore, for example an oil or gas well.

The term 'cylindrical' used in this specification is not to be construed as requiring perfect circularity. The invention is applicable to out of round surfaces, even elliptical, oval or irregular surfaces.

The invention is not however limited to use in well bores.

BACKGROUND OF THE INVENTION

Difficulties are often encountered in setting a high-integrity, fluid and gas-tight seal in an annular space where direct access to the space cannot be had. The invention seeks to provide a seal which can travel along an annular gap and can then be set or tightened at a particular position in such a gap and which is capable of sealing between two pipes which may be uneven and/or eccentric.

SUMMARY OF THE INVENTION

According to the invention, there is provided a sealing device for making a seal against a surface, the device comprising at least one flexible seal ring having a relaxed position in which it is out of contact with the surface and an active position in which it is in sealing contact with the surface, an operating member movable relative to the seal ring in a direction substantially parallel to the cylindrical surface to produce a substantially radial movement of the ring into its active position, and a plurality of elongate shape-memory material actuators arranged around the operating member so that a change of shape of the actuators produces the movement of the operating member which moves the seal ring into its active position.

The invention also provides a method of setting a seal against a surface, using a seal ring which is to be radially deformed to make sealing contact with the surface, wherein an operating member is movable relative to the seal ring in a direction substantially parallel to the cylindrical surface to produce a substantially radial movement of the ring into its active position, and a plurality of elongate shape-memory material actuators are arranged around the operating member so that a change of shape of the actuators produces the movement of the operating member which moves the seal ring into its active position.

The actual form of the seal ring is not significant to this invention. The invention however provides a mechanism for setting a seal ring into the sealed position.

The use of a shape-memory material allows the actuation of the seal to be triggered merely by providing some method for changing the temperature of the sealing device once it has reached its intended position. Heat can for example be generated electrically or chemically to actuate the seal, thus avoiding the need to apply mechanical force at a remote location. The heat can be generated internally, within the device or externally by a separate piece of equipment temporarily or permanently placed in proximity to the device.

The preferred method of actuation is for the actuators to contract rather than to expand because the contraction movement of a shape-memory material is substantially larger than an expansion movement.

The device preferably includes a main body component, part of which forms the seal ring. The actuator and the operating member are then connected to the main body. The main body is preferably a continuous component with no leak paths therethrough.

The operating member and the actuator can be formed from a single piece of shape-memory material, or they can be formed from separate pieces of material, with the actuator connecting the operating member to the main body.

In a preferred form of the invention, the main body has a skirt portion, the seal ring is formed at the free end of the skirt and the main body includes a secondary portion for sealing the cross-section surrounded by the cylindrical surface.

The skirt allows the seal ring to be connected to the main body, and yet to have sufficient freedom of movement (through flexing of the skirt) to allow the seal ring to move between its relaxed and active positions.

The cylindrical surface can be an internal cylindrical surface (the inside of a pipe) with the secondary portion of the main body being a continuous plug adapted to extend across the pipe bore to block the bore. Alternatively the cylindrical surface can be an external cylindrical surface (the outside of a pipe) with the secondary portion being a continuous cap adapted to close the pipe bore, a seal for seating a valve, tool or other device in the bore or a connector for another pipe or tool.

However the device can be used to seal an annular gap between two concentric or near concentric pipes. In this case the secondary portion of the main body will be a second skirt having a second seal ring adapted to seal against the inner of the two pipes.

The shape-memory material actuator rods preferably all have parallel axes extending parallel to the cylindrical surface and are preferably regularly spaced around the cylindrical surface. Alternatively however the actuator could be in the form of a cylindrical collar of shape-memory material or of a number of segmented portions. The rods will be housed in a cylindrical annular space between the skirt and the main body, and can have threaded ends which screw into threaded bores in the main body.

The operating member is preferably an annular ring with a tapered surface for contact with the seal ring to produce the radial movement of the ring when the tapered surface is moved axially relative to the ring. The annular ring can have one or two tapered surfaces, depending on whether there are one or two seal rings.

The annular ring can be continuous around the cylindrical surface, and can have a cross section which varies around the circumference, with the variation repeating itself between each shape-memory material rod attachment point. Alternatively the annular ring can be divided into separate segments around the cylindrical surface.

The cylindrical annular space in which the shape-memory material actuator is housed preferably has a vent opening to allow the escape of trapped fluid or gas as the volume within the space is reduced by movement of the seal ring into the space. This vent is preferably provided in the operating member and may have a one-way valve to prevent external atmosphere of foreign matter from entering the space.

The cylindrical surface is preferably of metal, and the seal ring can have a metal sealing surface so that a metal-to-metal seal is established by the device.

The tapered surfaces can have regions of different slope, so that the radial cam action of the tapered surfaces on the seal ring varies during the course of the relative movement between the operating member and the seal ring. At least part of the tapered surfaces preferably have a slope such that a self-locking action is produced by the friction between the tapered surfaces and the seal rings. This ensures that if the actuator should, during service, break or otherwise relax the force which produces the engagement between the operating member and the seal ring, then the operating member will stay in place.

The device may include within itself means for activating the shape change of the shape-memory material actuator. For example induction heating means may be included in the device.

BRIEF DESCRIPTION OF THE FIGURES

The invention will now be further described, by way of example, with reference to the accompanying drawings in which.

DETAILED DESCRIPTION OF THE INVENTION

Figure 1:
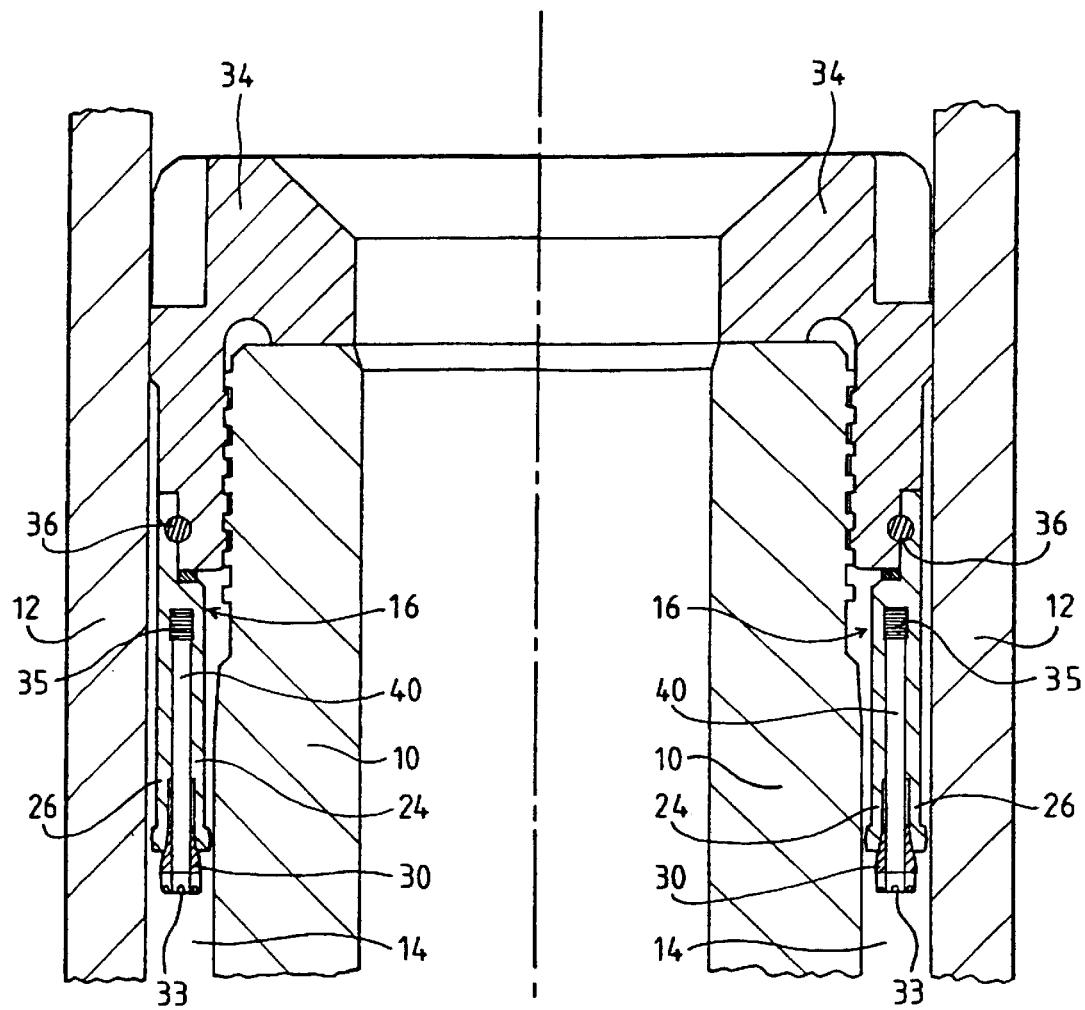
FIG. 1 is a cross section through two concentric cylindrical pipes, with an unactivated sealing device in the annular gap between the pipes.

FIG. 1 shows a first pipe 10 of smaller diameter positioned generally concentrically inside a second pipe 12 of larger diameter. An annular gap 14 is thus formed between the two pipes, and a sealing device 16 is inserted in this annular gap with the intention of closing the gap to gas and fluid flows.

The pipes 10 and 12 can typically be oil well casings or pre-machined sub-sections. Oil well casings often extend a very great length, with a large part of the length being subterranean. In the case of a casing seal, the sealing device may be located at any point along the length of the well. The invention is not however limited to this application, and can also be used in other applications where a seal is to be made between two pipes (which may or may not by cylindrical pipes). The invention is however particularly suitable for use in applications where the intended position of the seal is inaccessible.

Figure 2:
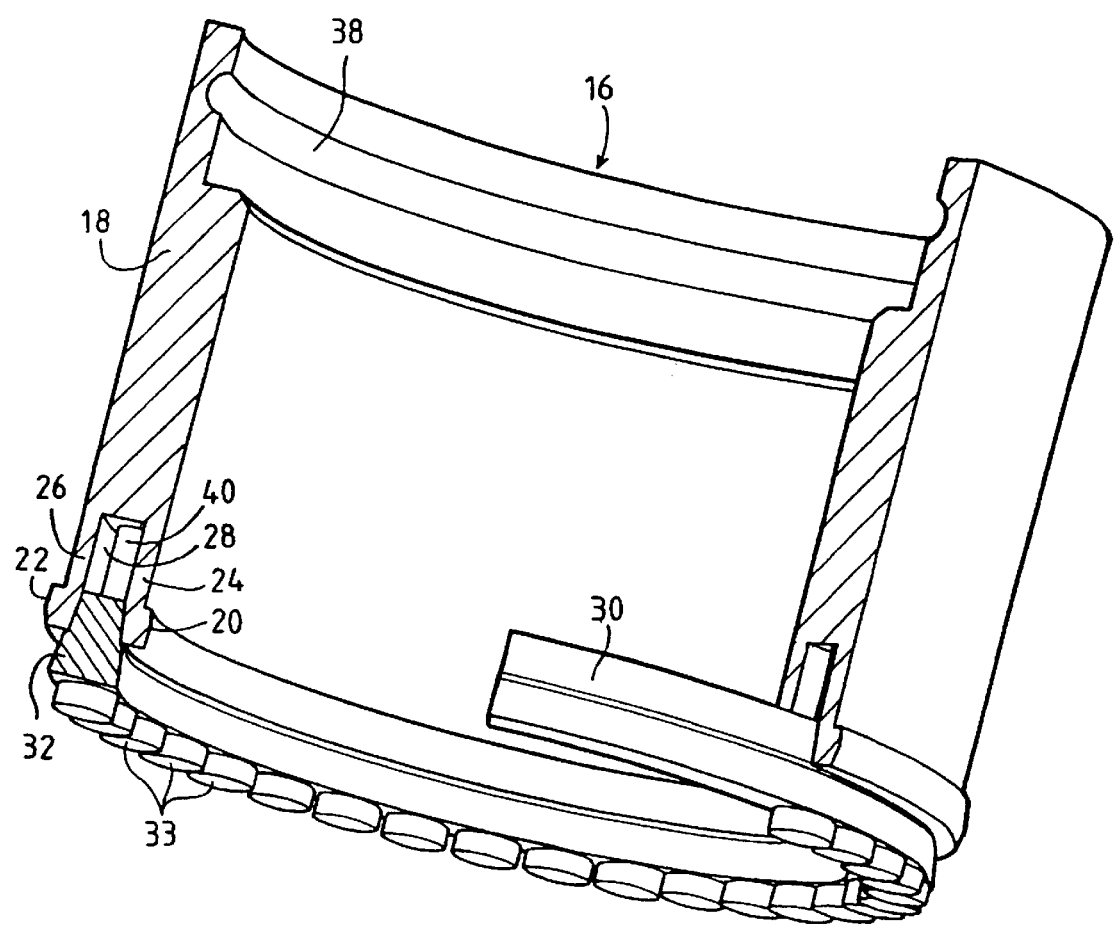
FIG. 2 is a partially cut away perspective view of the sealing device shown in FIG. 1.

As can be seen in FIG. 2, the sealing device 16 is circular/cylindrical in form and extends continuously around the whole of the annular gap 14. The device 16 has a main body 18 which, in the embodiment of FIGS. 1 and 2, is of a single piece of material, preferably metal. The body 18 has an internal seal surface or lip at 20 and an external seal surface or lip at 22. These seal surfaces are at the lower edges of an internal skirt 24 and an external skirt 26, there being an annular space 28 between these two skirts.

An expander ring 30 which has a wedge-shaped cross section as seen at 32 is fitted between the lower ends of the skirts 26 and 24, such that when the ring 30 is pulled up into the space 28, the seal surfaces or seal lips 20 and 22 are forced apart and seal against, respectively, the external surface of the first pipe 10 and the internal surface of the second pipe 12. Because the body 18 is a single piece of material, once seals are made at 20 and 22 with the pipe walls, there are no other leak paths past the sealing device 16.

In order to support the sealing device 16 in the gap 14, the upper part of the body is mounted on a carrier 34 through a ball bearing race 36 which engages in a groove 38 in the main body 18.

In order to draw the wedge-shaped ring 30 between the seal lips 20, 22 and thus to set the seal, a series of long bolts or rods 40 of shape-memory material are mounted in the body 18. The rods have heads 33 (which may be hexagonal) and threaded ends 35 and locate in bores 31 which extend upwards from the space 28. The threaded ends 35 screw into corresponding sockets in the body 18 at the tops of the bores 18, and the heads 33 engage beneath the ring 30.

Shape-memory materials are well known. On being subjected to a change in temperature beyond a pre-determined threshold, the shape of the material reverts to a previous configuration.

The precise shape-memory mechanism to be used is not critical to the present invention. It is however highly desirable that the change in shape is a contraction. A typical shape-memory material in the form of a rod can contract by up to 8% on exceeding its critical temperature. As the volume of the rod will generally stay the same, on contraction there is likely to be a corresponding radial expansion of the rod, and the width of the bores 31 will be sufficient to accommodate this expansion.

Depending upon the nature of the shape-memory material, the critical temperature may be above or below the temperature at which the sealing device is held, until actuation. Usually however the critical temperature will be higher than the ambient temperature, or the sealing device may be held at a sub-ambient temperature until actuation is to take place, and actuation then results from allowing the sealing device to reach ambient temperature.

The term 'shape-memory material' includes all materials which have the property of reverting to a previous or different shape, after being subjected to a specific treatment. Shape-memory materials are known which revert to a previous shape on passing through a transition temperature. These materials are usually metal alloys, but the term 'shape-memory material' is not restricted to metals and includes plastic materials which exhibit the same property.

A wide variety of mechanisms can be employed for producing the temperature change necessary to actuate the shape-memory material. These mechanisms include induction heating (and the heating element may be lowered down the bore of the inner pipe 10), incorporating electrical heating elements either within the body 18 or within the rods 40, applying heat through an exothermic chemical reaction, circulation of fluid from a reservoir or from the surface, heat generation through friction, or placing an energy conversion device in the proximity of the sealing device.

Figure 3:
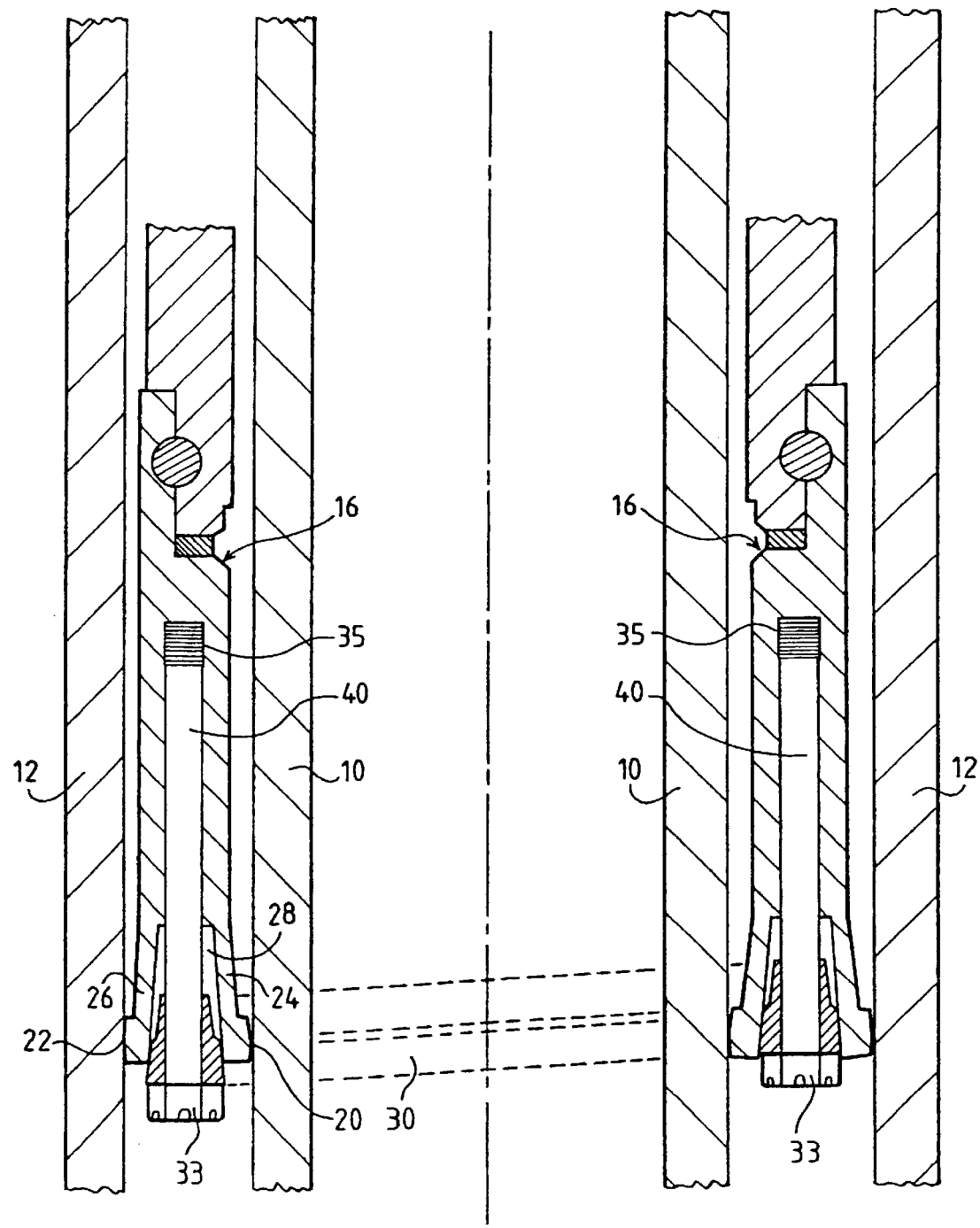
FIG. 3 is a view corresponding to FIG. 1 but showing the device in the activated condition in an eccentric annulus.

One important feature of the present invention is that it allows a seal to be formed in an annular gap 14, even though that gap may not be the same width all the way round. For example, if the pipes 10 and 12 are not quite concentric, the annular gap will be wider at one point around the circumference than at another point around the circumference. However the seal provided by the present invention is able to still form a high-integrity seal around all parts of such an annular gap. This is illustrated in FIG. 3 where it will be seen that the wedge-shaped ring 30 rises further on the right hand side of the annulus to spread apart the lips 20, 21 than it does on the left hand side of the annulus. To do this the ring 30 is slightly distorted out of its original plane, but it can accommodate this without difficulty.

It is a characteristic of some shape-memory materials that the force applied by the change of shape rises to a certain value when the change in shape begins, and then remains at substantially the same value irrespective of the extent of the change of shape which is allowed by the surroundings of the shape-memory material. Thus in FIG. 3, the upward force applied to the wedge-shaped ring 30 will be the same all around the circumference, even though in some parts the rods 40 will contract further than at other parts.

Figure 4A:
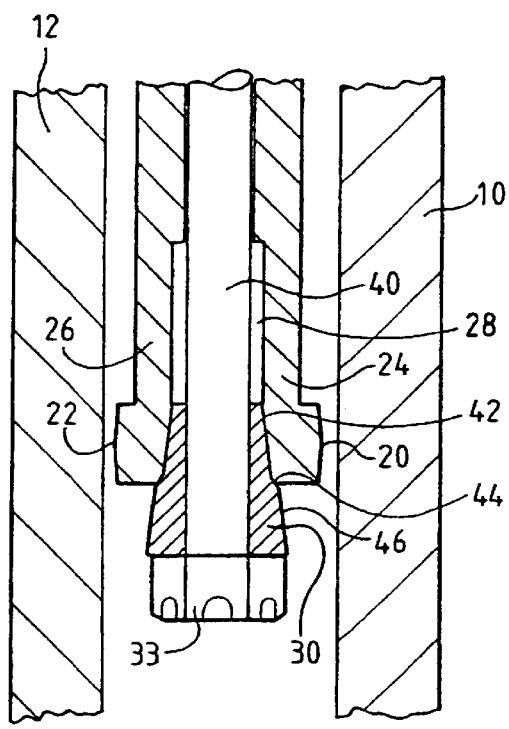
FIG. 4a is a detailed view on a larger scale, of part of the sealing device of FIGS. 1 and 2, showing the device in the unactivated condition.
Figure 4B:
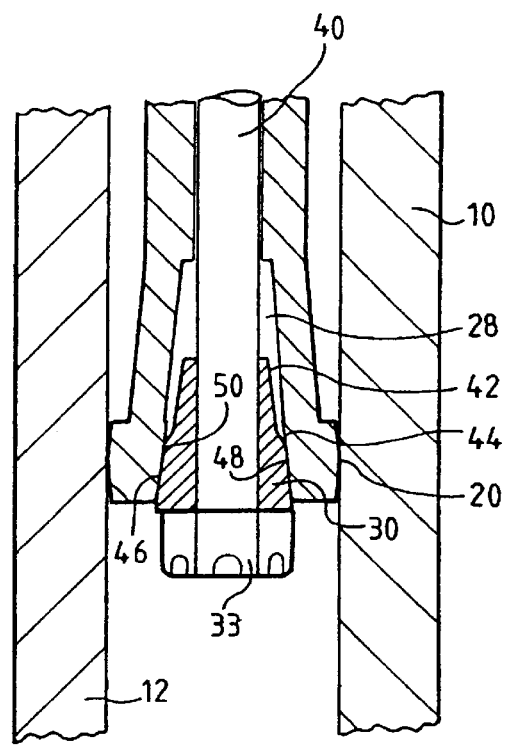
FIG. 4b is a view corresponding to FIG. 4a but showing the device in the activated condition.

FIGS. 4a and 4b show on a larger scale the construction of the seal itself and the distortion which takes place between the unactivated and activated conditions. The seal lips 20, 22 have an external barrelled shape. When the lips are pressed against the flat surface of the adjacent pipe walls, a stress pattern is obtained which ensures positive sealing over a relatively wide area. The design of the sealing surfaces follows conventional knowledge in this area. However the setting of the seals as described here can increase the available seal setting force compared with known seals, and thus enable higher pressure and/or increased reliability seats.

The invention is of course not limited to the use of a barrelled seal. It is useful for activating a range of conventional seal profiles, with one or more contact areas as at 20,22.

It will also be seen that the lateral tapering surfaces of the ring 30 have three surface regions, namely a first region 42 against which the internal lower edges of the skirts 24, 26 will rest before seal actuation, a second region 44 which will be drawn into the space 28 initially when the rod 40 starts to contract, to provide a relatively rapid outward movement of the lips 20, 22 and a third region 46 which will provide the necessary radial forces on the lips 20, 21 to effect a good seal and will be self-locking between the surfaces 48, 50 behind the lips 20, 21. This self-locking means that if, for example, the rod 40 should break or relax whilst the seal is in service, the wedge-shaped ring 30 will remain locked between the lips 20, 22 so that the sealing function is not impaired.

Although the sealing device 16 is shown in FIG. 2 with a continuous wedge-shaped ring 30, it is not essential that this ring be continuous. It may be sufficient for each rod 40 to have a discrete wedge member at its lower end, and if these are sufficiently closely spaced around the circumference of the ring, an adequately uniform force all round the lips 20, 22 can be maintained. In such a situation, the shape of the lower ends of the skirts 24, 26 may also vary around the circumference, to provide circumferential stiffness in the areas between the wedges.

It is within the scope of the invention for the rods 40 to be replaced by elongate actuators of other cross-sectional form.

It will be apparent that, in the embodiment shown in FIGS. 1 and 2, the internal space 28 between the skirts 24 and 26 is sealed. It may be desirable to fill this space with a protective atmosphere to protect the rods 40 during their service life and/or to fill the space with a composition which will generate the heat needed to actuate the rods. If the space is sealed, a vent passage may be provided, for example through the ring 30, and this passage could be provided with a valve, preferably a one-way valve, which will allow any incompressible material contained within the space 28 to be vented as the wedge-shaped ring 30 is drawn into the space, to reduce the volume of the space.

Figure 5:
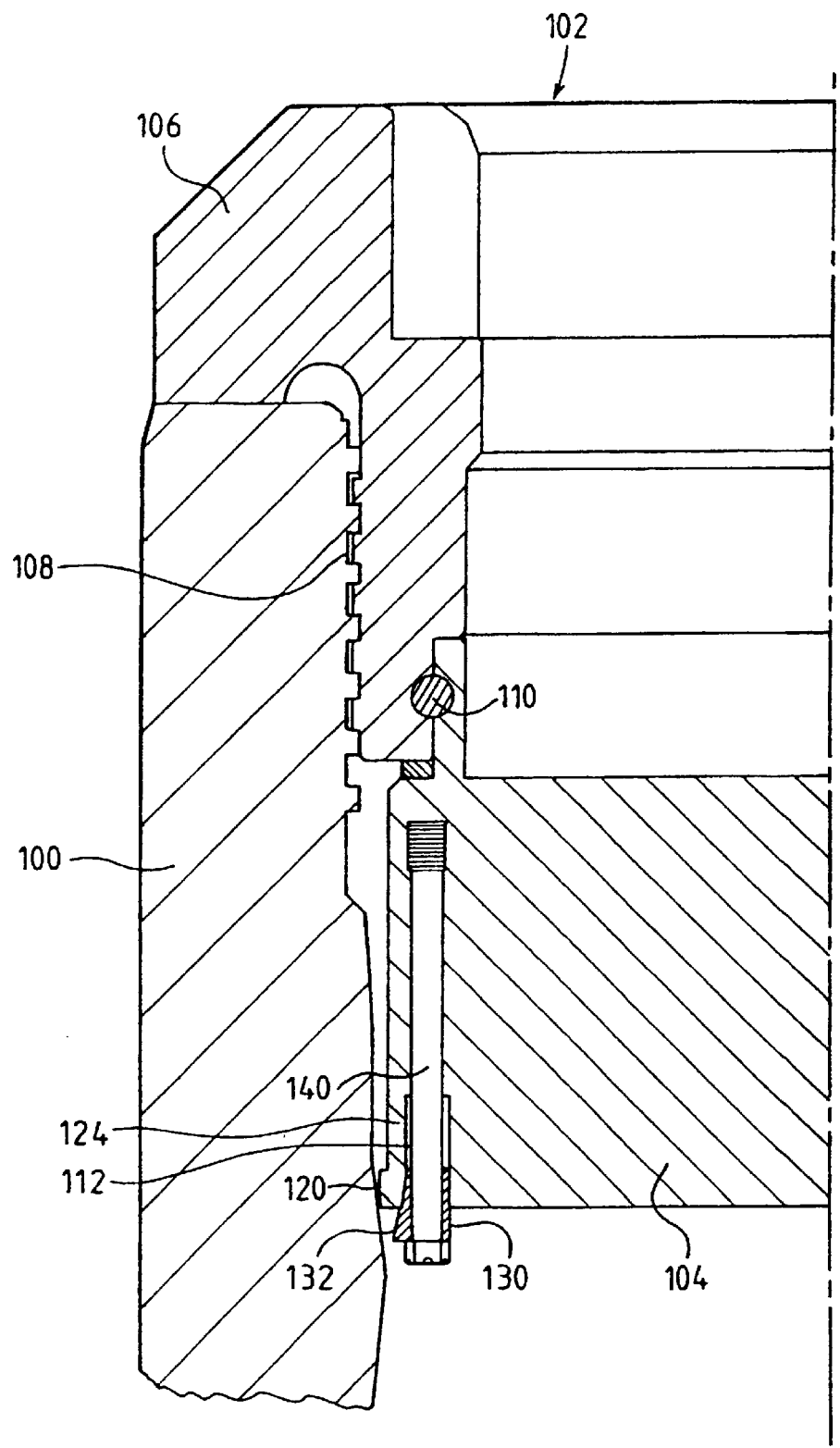
FIG. 5 is a cross section through a second embodiment of sealing device in accordance with the invention.

The sealing device can be used in situations other than in sealing an annulus. FIG. 5 shows the same principle being used as a plug seal. Here the end of a pipe 100 is to be closed and sealed by an internal plug generally designated 102. The plug consists of a solid body 104 carried by a carrier 106 which is threaded into the top of the pipe 100 on a thread 108. The plug body 104 is carried on the carrier 106 by a ball race 110.

The plug body may be a simple plug as shown, or it may form a base on which another component such as a valve, a tool or a connector is carried. The component may itself form the plug, ie the seal could be part of a component (eg a pumping system) designed to seal around its outside diameter when in place.

Around the edge of the plug body 104 is an annular space 112 and shape-memory material rods 140 (similar to the rods 40 shown in FIG. 2) are received in this space and support at their lower ends a ring 130 which has on its outer circumference a wedge-shaped profile 132.

Around the outer edge of the space 112 is a skirt 124 with a seal lip 120 at its lower end.

Actuation of the shape-memory material rod 140 will draw the ring 130 into the gap 112 to force the seal lip 120 outwardly against the inner diameter of the pipe 100, to form a seal in precisely the sane way as described with reference to the earlier figures. As the plug body 104 is a continuous piece of material, there will be no leak path past the plug.

Figure 6:
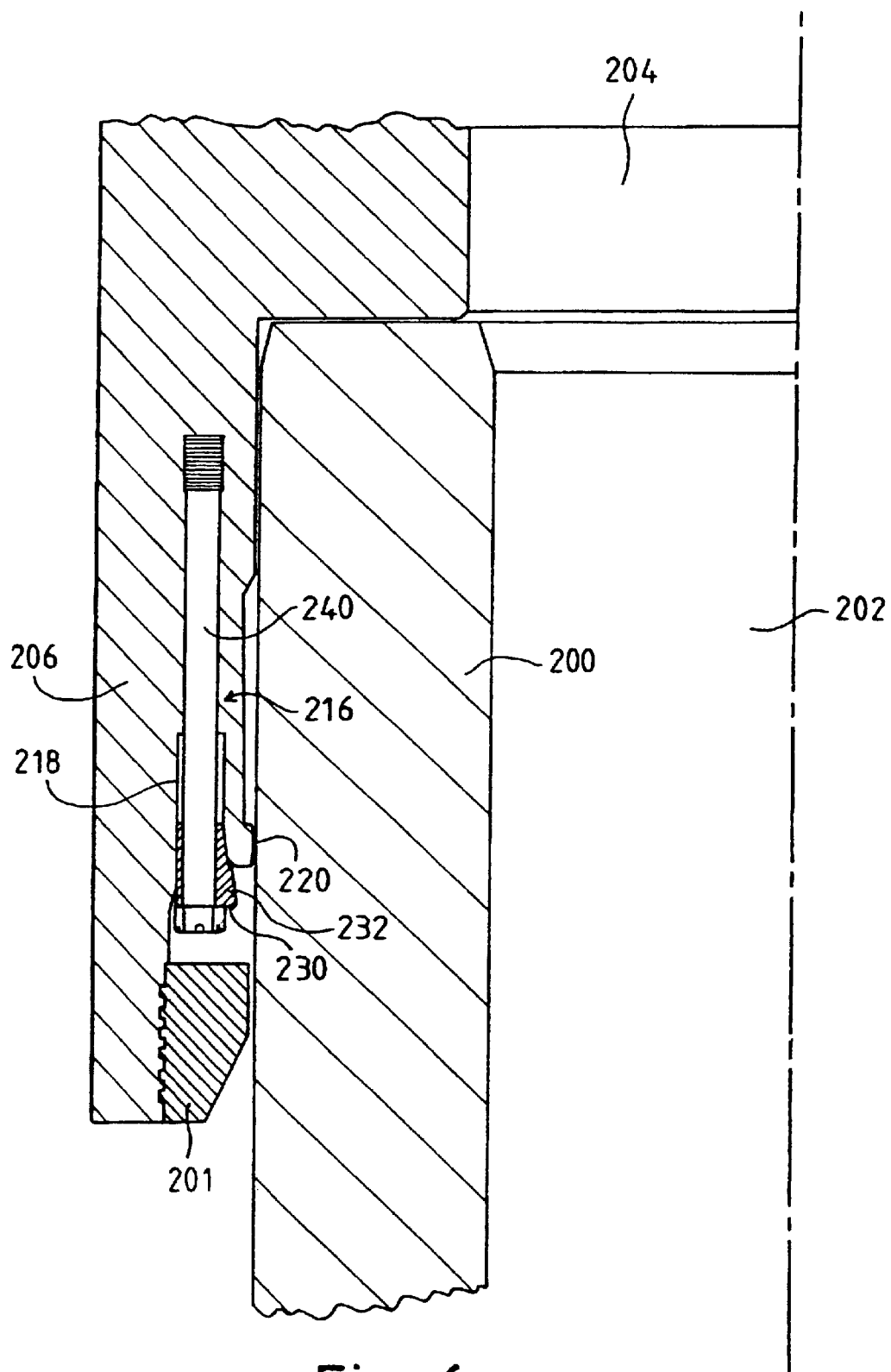
FIG. 6 is a cross sectional view through a third embodiment of sealing device in accordance with the invention.

FIG. 6 shows a pipe 200 with a bore 202 which is to be closed by a cap 204. The cap 204 has a collar 206 which fits over and around the exterior of the pipe 200. The collar 206 ends in a protective ring 201 which protects a sealing device 216 during assembly of the components. The sealing device 216 is formed by shape-memory material rods 240 fitted in an annular space 218 in the collar 206 the rods have an annular ring 230 at their lower ends. The ring this time has an internal wedge-shaped surface 232 which cooperates with a lip 220 and, on actuation of the rods 240, the wedge 230 is drawn into the space 218 to deflect the lip 220 inwards into contact with the external surface of the pipe 200.

The cap 204 can, in a manner similar to the plug body 104 be a simple cap as shown, or it may form a base on which another component such as a valve or a connector is carried.

Figure 7:
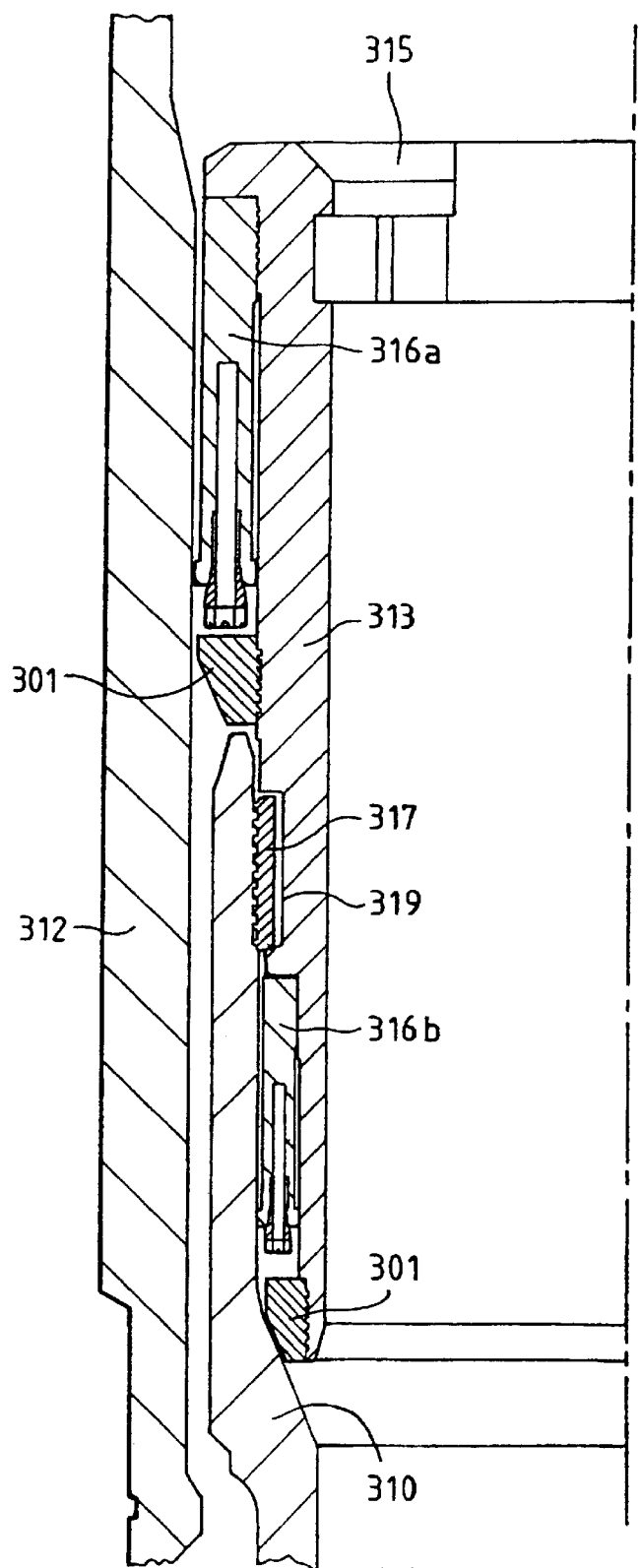
FIG. 7 is a cross-sectional view through a first bowl-type annular seal in accordance with the invention.
Figure 8:
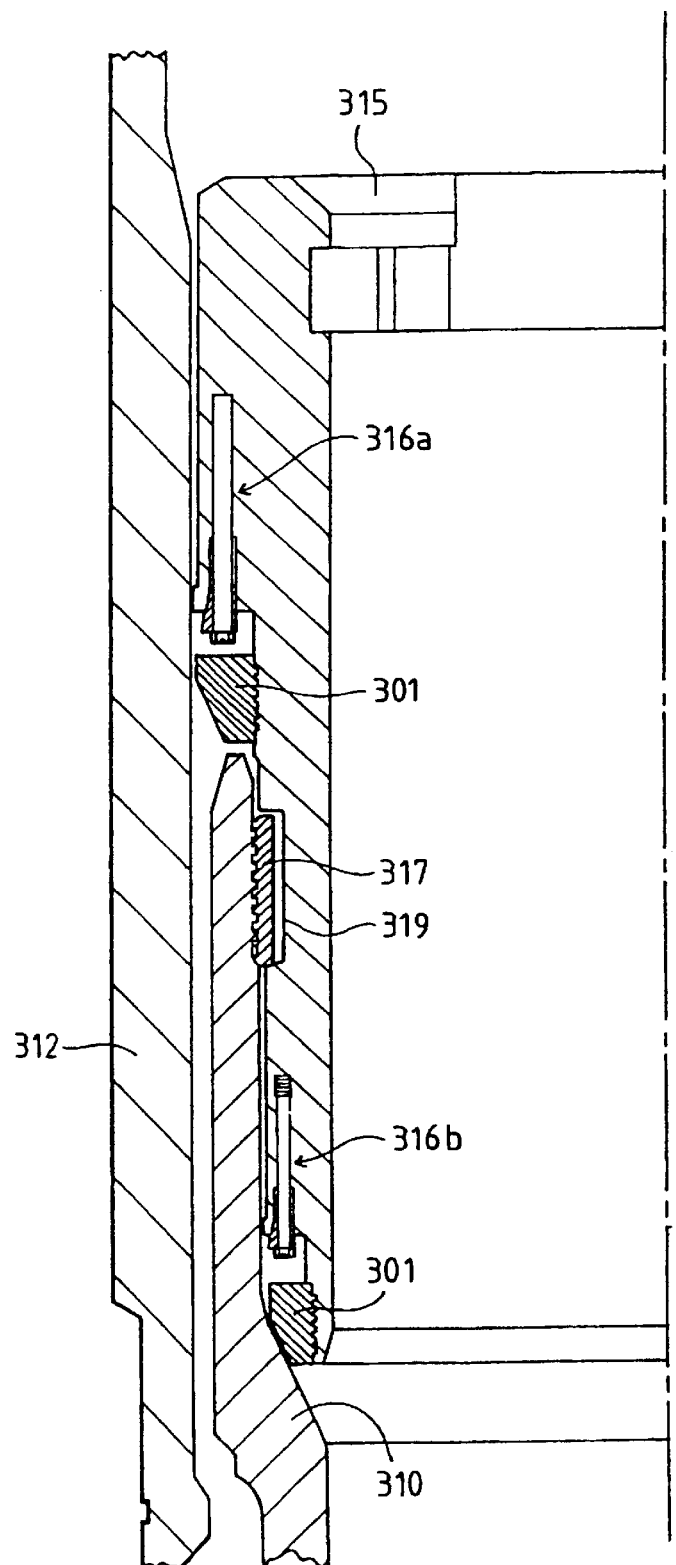
FIG. 8 is a cross-sectional view through a second bowl-type annular seal in accordance with the invention.

FIG. 7 shows an annular bowl seal with independent sealing devices, and FIG. 8 shows a similar annular bowl seal with integrated sealing devices. In theses two figures, the same reference numerals will be used for the same parts.

In order to make a seal between an outer pine 312 and an inner pipe 310, a bowl seal body 313 is lowered into the pipe assembly and sealed on its outer circumference to the inner circumferences of both pipes. The body 313 provides an internal cover in the well casing at the position of the joint between the inner and outer pipes, so that other components being passed down the casing do not damage the joint.

The bowl seal body 313 is run in to the casing using a running tool which connects with the top end of the component at 315 in a conventional manner. A threaded collar 317 supported in an annular groove 319 on the body 313 engages with an internal thread on the pipe 310. This ensures correct axial positioning of the body.

Above the collar 317, the body carries a first memory material sealing device 316a, and below the collar the body carries a second memory material sealing device 316b. The sealing device 316a seals between the top part of the body 313 and the outer pipe 312. The sealing device 316b seals between the lower part of the body 313 and the inner pipe 310.

In FIG. 7, the sealing devices 316 are of the type shown in FIGS. 1 to 4. In FIG. 8, the sealing devices are of the type shown in FIG. 5.

The bowl seal body 313 is also fitted with protective rings 301 to protect the sealing devices 316 as the bowl seal body is lowered into the casing.

Figure 9:
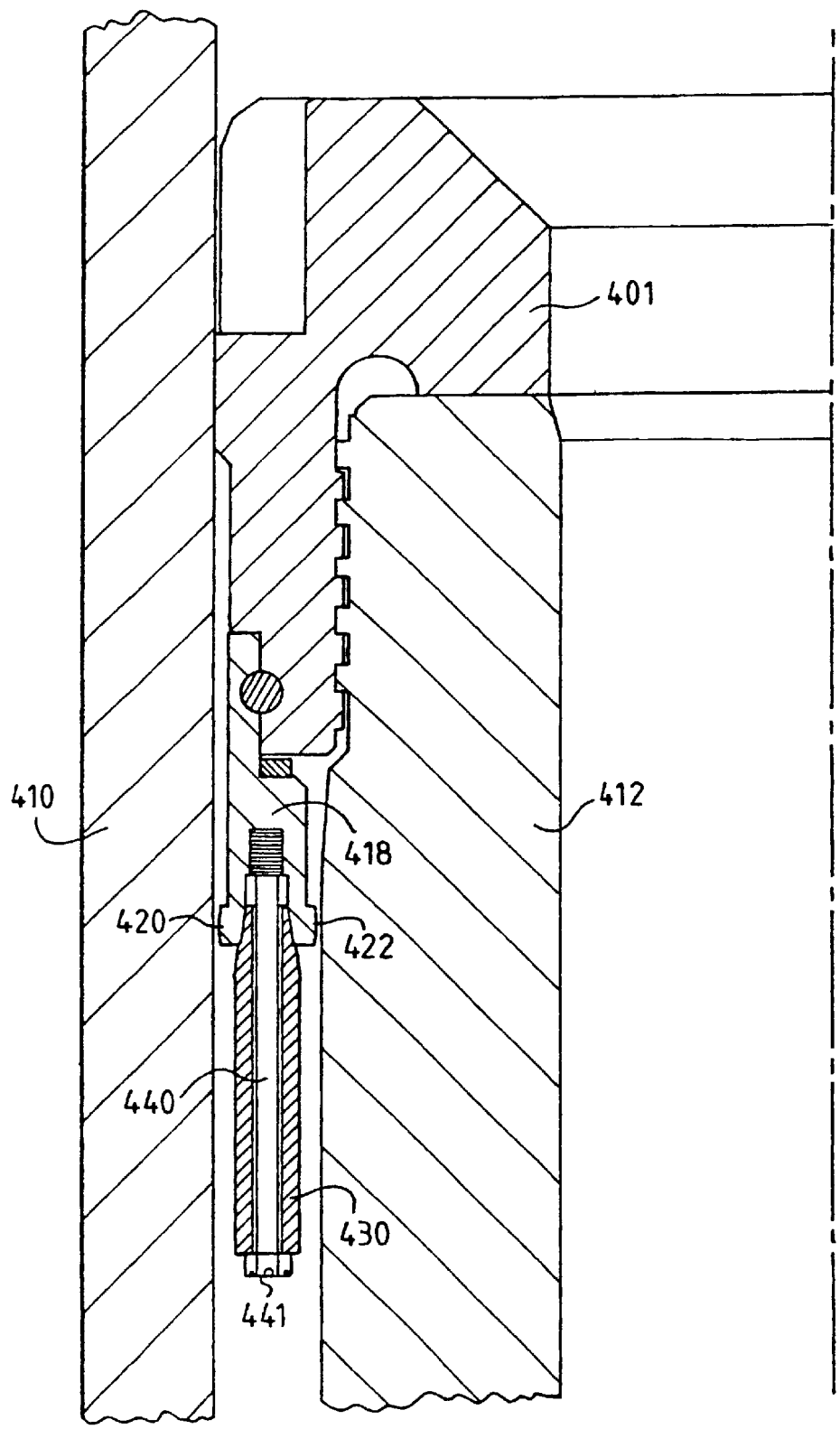
FIG. 9 is a cross-sectional view through a fourth embodiment of sealing device.

FIG. 9 shows another arrangement of the sealing device in accordance with the invention which operates in a similar fashion to the embodiment of FIGS. 1 to 4. In this arrangement a main body 418 has a relatively short axial dimension leading to the seal faces 420, 422. The shape-memory material actuator 440 (which has to be long enough to allow it to perform the required contraction) is located below the body 418, and the wedge-shaped ring 430 has a long axial length between a head 441 of the actuator and the cam surfaces of the seal lips 420, 422. The end of the actuator rod 440 remote from the head 441 is screwed into a threaded bore into the body 418, as previously described.

Contraction of the bolt 440 causes the seal lips 420, 422 to be urged radially outwards and radially inwards respectively, to make sealing contact with the pipes 410, 412.

All or part of the wedge 430 can be shape-memory material as well as, or instead of, bolts 440. If both are of shape-memory materials, the wedge 430 can be of a material which expands and the bolts can be of a material which contracts as actuation takes place. With such an arrangement, the sealing device can be shorter overall than otherwise. This can be particularly useful if axial space is limited.

Figure 10:
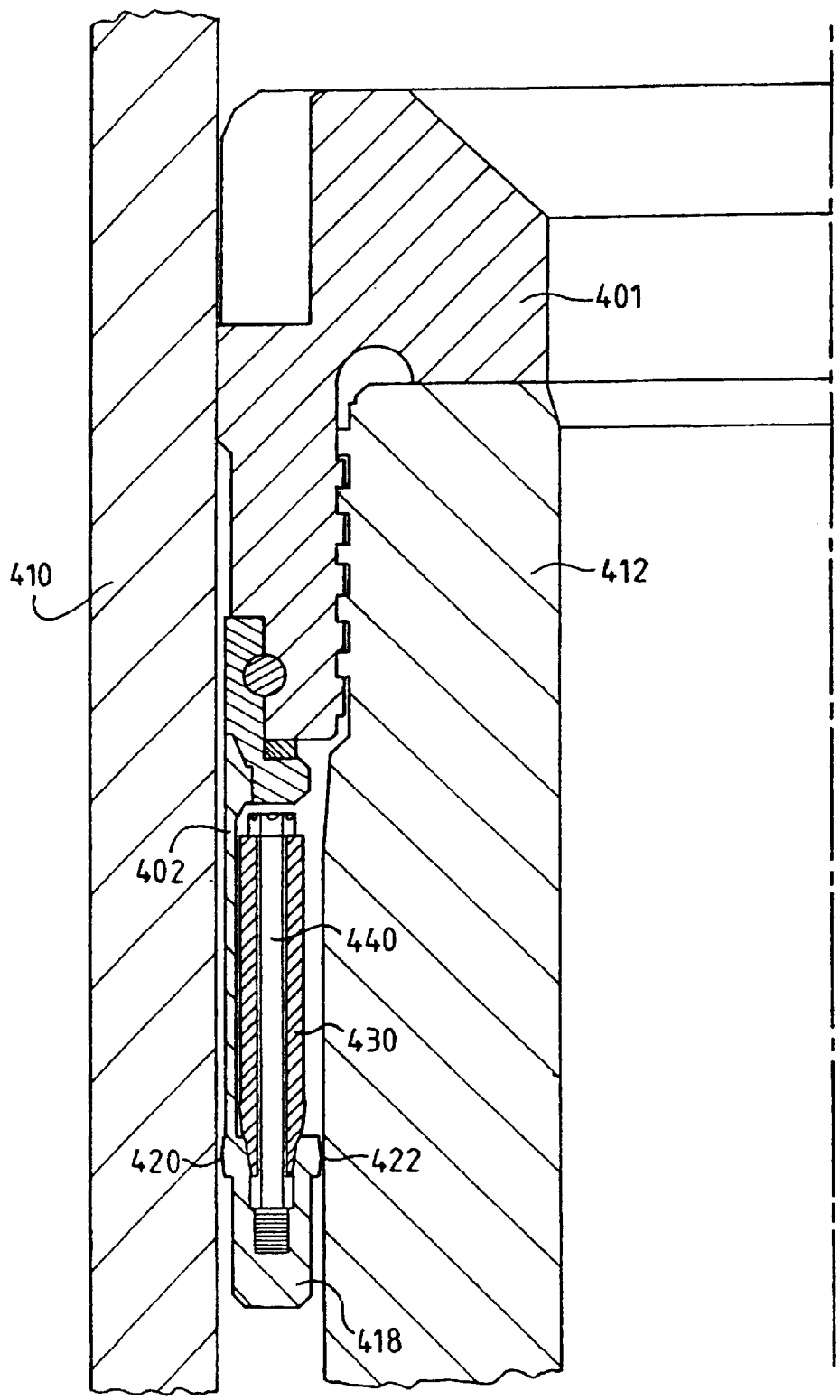
FIG. 10 is a cross-sectional view through a fifth embodiment of sealing device.

FIG. 10 shows a similar arrangement where the same reference numbers have been used. In this case however the main body 418 is at the lower end of the actuator but connected to the carrier 401 by a strap or web 402.

In the embodiments of FIGS. 9 and 10, a further functional possibility exists. If the wedge member 430 is also made of shape-memory material, a two-stage action can be achieved. The wedge member 430 and the actuator 440 can be of shape-memory materials which are activated at different temperatures, and by activating first one and then the other, certain advantages could be obtained. For example the seal could be set by causing one component 430 to trigger and expand and could be disengaged by casing the other component 440 to trigger and expand.

Figure 11:
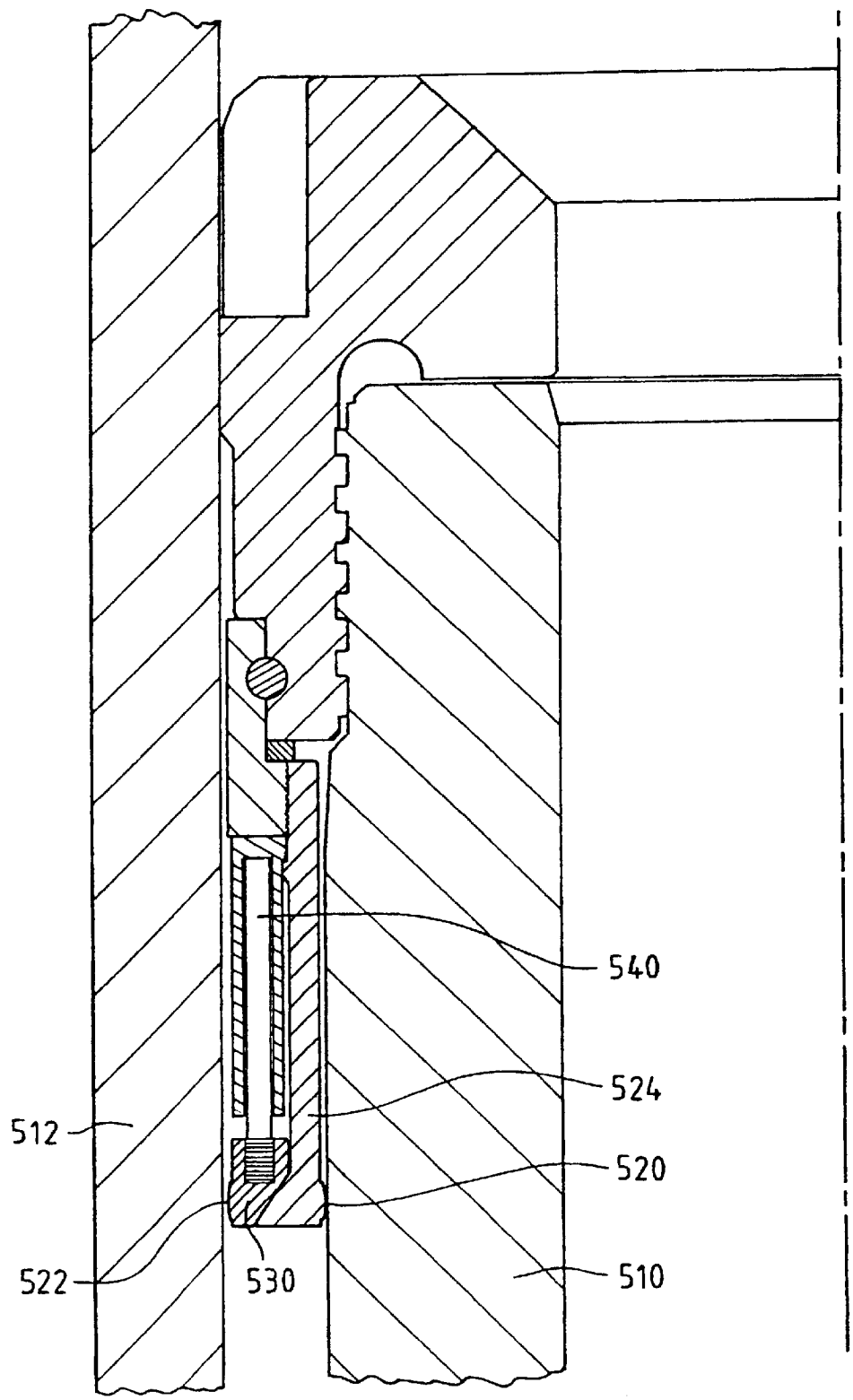
FIG. 11 is a cross-sectional view through a sixth embodiment of sealing device.
Figure 12:
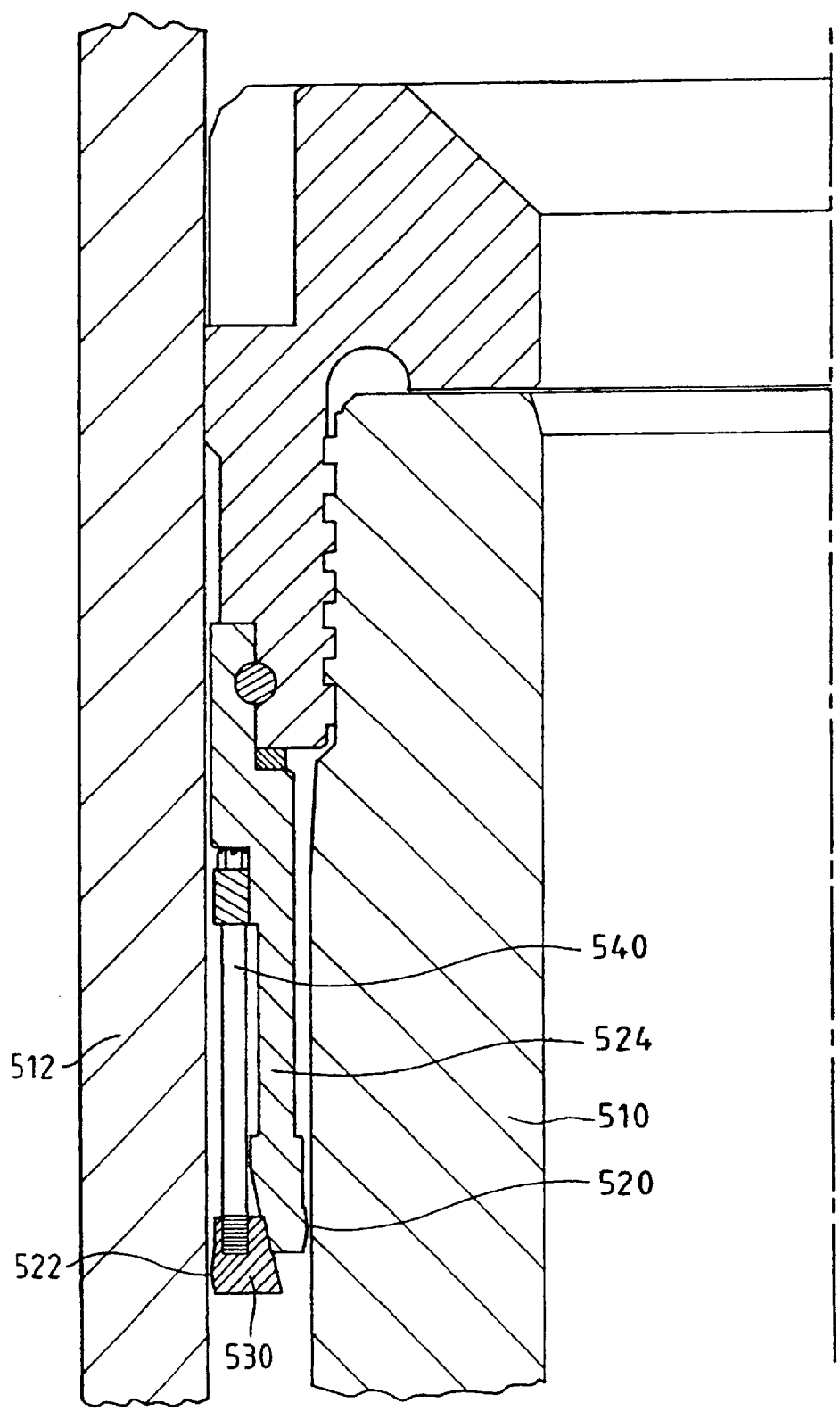
FIG. 12 is a cross-sectional view through a seventh embodiment of sealing device.

FIGS. 11 and 12 show two alternative seal devices where the operating member is a ring 530 which itself forms one of the seal faces 522. The other seal face 520 is formed on a skirt 524. The ring 530 and the foot of the skirt 524 have mating wedge or cam surfaces arranged so that as the actuator rods 540 extend (FIG. 11) or contract (FIG. 12) relative to the skirt 524, the ring 530 is forced radially in one direction against one surface 512 and the seal face 522 is forced radially in the opposite direction to seal against the face 510, to for a seal.

Figure 13:
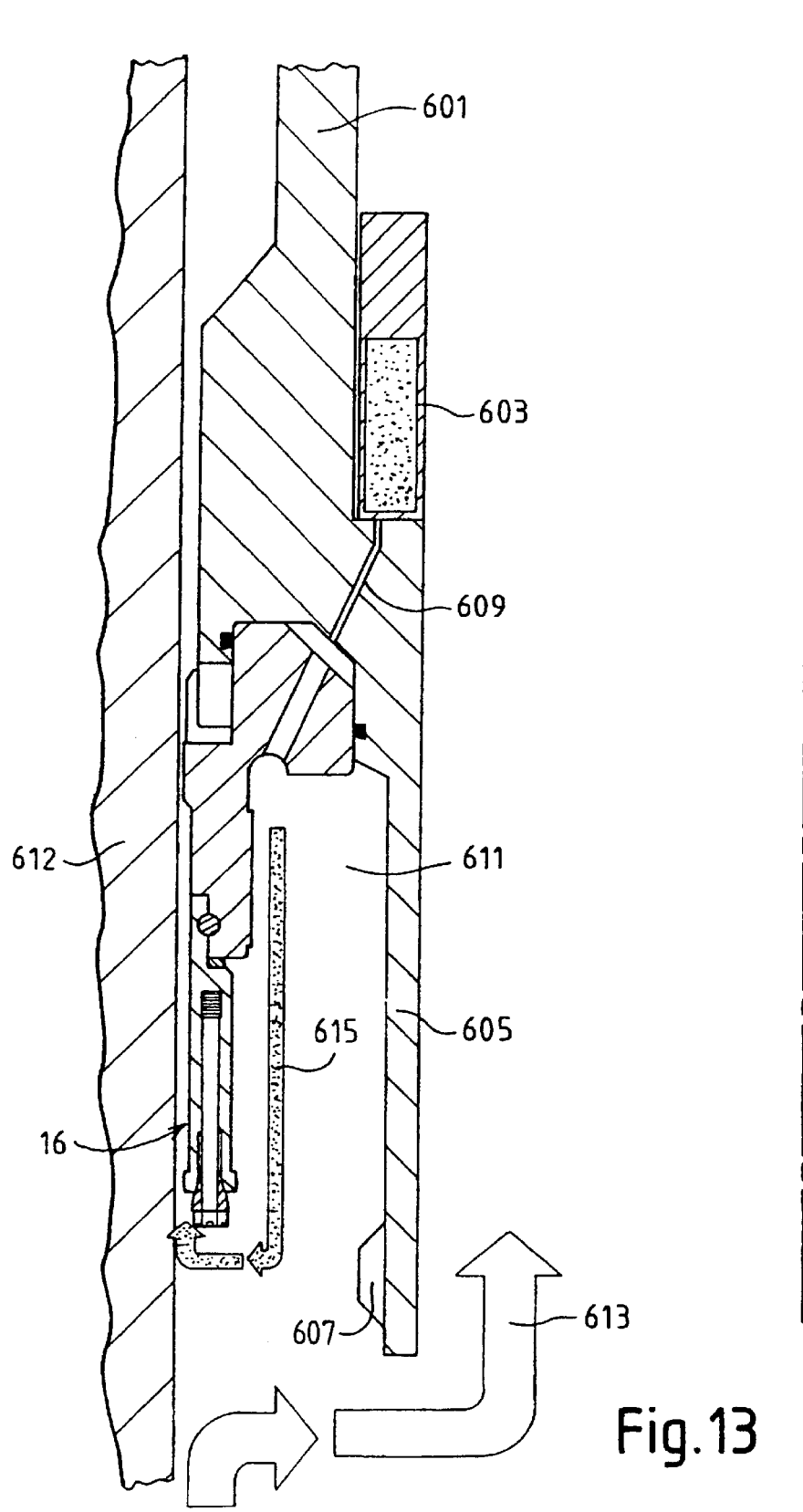
FIGS. 13 & 14 show the positioning of a seal as shown in FIGS. 1 and 2, with the aid of an active cooling arrangement.
Figure 14:
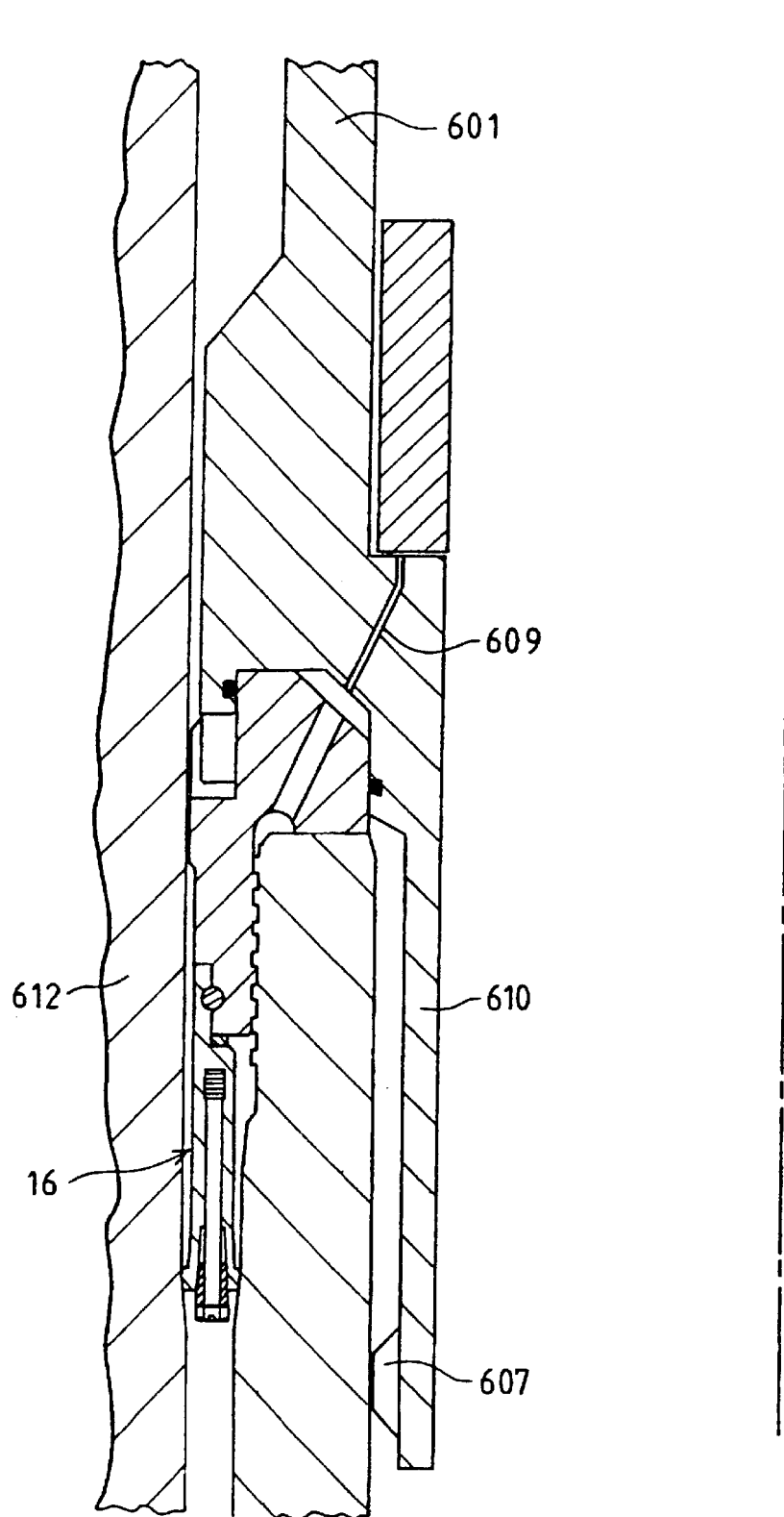

FIGS. 13 and 14 illustrate the placement of a seal device of the general type described in FIG. 1, and its actuation. The seal components will be referred to using the same reference numerals as used in FIG. 1.

It is frequently the case, in drilling operations, that seals have to be set at locations well below ground level, where the ambient temperature is relatively high. The existence of these temperatures can be used to actuate the shape-memory material and to set the seal, but for this to work, the seal must be kept cool until it and the components it is to seal are in their correct relative positions.

FIG. 13 shows a running tool 601 which carries a cooling fluid reservoir 603 (liquid nitrogen might be suitable as cooling fluid) and which supports a sealing device 16 on a carrier 634. The running tool has an annular shroud 605 with a guide lug 607.

The reservoir 603 communicates with a fluid passage 609 extending through the running tool and through the carrier. A valve may be fitted to control flow through this passage, or the passage may be sized to permit only the desired flow rate through it. The cooling fluid flows through this passage into the annular space 611, around the sealing device 16 and exits around the outside of the sealing device and back up the well casing 612. In flowing past and around the sealing device as shown by an arrow 615, it cools the device and keeps the shape-memory material below its actuation temperature. The cooling fluid also displaces any warmer fluid existing lower down the well, and prevents this from entering the space 611, as indicated by the arrow 613.

FIG. 14 shows the components having reached their final positions. The running tool is now lowered onto an inner casing 610 and the sealing device 16 slides between the inner casing 610 and the outer casing 612. The flow of cooling fluid is then shut off which allows the temperature of the sealing device to rise to the ambient temperature at that position, whereupon the shape-memory material is actuated and contracts to set the seal. The running tool can then be removed, leaving a seal set between the casings 610 and 612.

As with methods of heating, there are numerous other possible methods of cooling such as chemical cooling, the use of a large heat sink or a global circulation of cooling fluid which could be passed through the area of the seal.

It is a feature of the invention that the seal can be fitted at any point along the length of a pipe as it does not rely on an interrelationship with the pipe wall. However, there are instances where a seal as described may need to be dismantled. If this is the case, then it may be necessary to form a part of the annular gap 14 with a taper as shown at 314 in FIG. 14. The presence of the taper makes it possible to remove the seal by exerting a large, upwardly-directed force on the sealing device.

The seal described here has the advantage over known seals that it can be easily placed at any desired position where a seal is to be effected, and remotely actuated without the need to apply mechanical force. The fact that the seal is a unitary device where all the components are connected together before the seal is put into position allows the seal to be placed in a single action.

The seal can be effective in situations where the annulus to be sealed varies in width around the circumference, and/or where the surface of one or other of the surfaces is rough or uneven.

The seal can be used for a wide variety of different sealing applications, including aerospace applications, chemical engineering applications and nuclear engineering applications, among others. Depending on the application, the seal elements can be in a wide variety of materials, including metals, plastics and ceramics.

Clearly the materials of the seal components should be chosen to be compatible with the materials which will come in contact with the seal, and so that the seal does not degrade over its working life.

The advantages of the seal stem from the use of an array of separate shape-memory metal members all of which act on the seal ring to set it, but which contract (or expand) independently and are able to adapt their shape in accordance with the conditions which exist at the position of each of the members.

What is claimed is:

1. A sealing device for making a seal against an annular surface, the device comprising at least one flexible seal ring having a relaxed position in which the seal ring is out of contact with the surface and an active position in which the seal ring is in sealing contact with the surface, an operating member movable relative to the seal ring in a direction substantially parallel to the annular surface to produce a substantially radial movement of the ring into the active position, and a plurality of elongate, substantially parallel shape-memory material actuators arranged around the annular surface so that a change of shape of the actuators produces the movement of the operating member which moves the seal ring into the active position wherein the actuators are in the form of rods, the axes of which extend substantially parallel to the surface and the actuators each have one threaded end and one end with a head, the threaded ends are screwed into threaded sockets in the main body and the heads engage the operating member.

2. A sealing device as claimed in claim 1, wherein the actuators are arranged so that a contraction of the actuators produces the movement of the operating member which moves the seal ring into the active position.

3. A sealing device as claimed in claim 1, which includes a main body component, part of which forms the seal ring, and wherein the actuators are connected to the main body and the operating member is connected to the actuators.

4. A sealing device as claimed in claim 3, wherein the main body has a skirt portion, the seal ring is formed at the free end of the skirt and the main body includes a secondary portion for sealing the cross-section surrounded by the cylindrical surface.

5. A sealing device as claimed in claim 4, wherein the cylindrical surface is an internal cylindrical surface and the secondary portion is a continuous plug adapted to extend across the cross-section surrounded by the cylindrical surface.

6. A sealing device as claimed in claim 4, wherein the cylindrical surface is and external cylindrical surface and the secondary portion is a continuous cap adapted to extend across the cross-section surrounded by the cylindrical surface.

7. A sealing device as claimed in claim 4, wherein the cylindrical surface is an internal cylindrical surface wherein a second, smaller diameter cylindrical surface lies within the first cylindrical surface to form an annular space between the two surfaces, and wherein the secondary portion of the main body is a second skirt having a second seal ring adapted to seal against the smaller diameter cylindrical surface.

8. A sealing device as claimed in claim 7, wherein the operating member is an annular ring with two opposite tapered surfaces, one for contacting each of the seal rings to produce the radial movement of the rings when the tapered surfaces are moved axially relative to the rings, and wherein the annular ring has two opposite tapered surfaces, one for contacting each of the seal rings.

9. A sealing device as claimed in claim 4, wherein the shape-memory material actuator comprises a plurality of shape-memory material rods, all with parallel axes extending parallel to the cylindrical surface and all regularly spaced around the cylindrical surface, and wherein the rods are housed in a cylindrical annular space between the skirt and the main body.

10. A sealing device as claimed in claim 3, wherein the main body is a continuous component with no leak paths there through.

11. A sealing device as claimed in claim 1, wherein the shape-memory material actuator comprises a plurality of shape-memory material rods, all with parallel axes extending parallel to the cylindrical surface and all regularly spaced around the cylindrical surface.

12. A sealing device as claimed in claim 11, wherein the operating member is an annular ring with a tapered surface for contact with the seal ring to produce the radial movement of the ring when the tapered surface is moved axially relative to the ring.

13. A sealing device as claimed in claim 12, wherein the annular ring is continuous around the cylindrical surface.

14. A sealing device as claimed in claim 12, wherein the tapered surface has regions of different slope, so that the radial cam action on the seal ring varies during the course of the relative movement between the operating member and the seal ring.

15. A sealing device as claimed in claim 14, wherein the slope of the tapered surfaces is such that a self-locking action is produced by the friction between the tapered surfaces and the seal rings.

16. A sealing device as claimed in claim 1, wherein the cylindrical surface is of metal, and the seal ring has a metal sealing surface so that a metal-to-metal seal is established by the device.

* * * * *